United States Patent [19]

Potter

[11] Patent Number: 4,717,118

[45] Date of Patent: Jan. 5, 1988

[54] ELECTROMAGNETICALLY OPERABLE VALVE

[75] Inventor: James C. Potter, London, England

[73] Assignee: Lucas Industries Public Limited Company, Birmingham, England

[21] Appl. No.: 54,531

[22] Filed: May 27, 1987

[30] Foreign Application Priority Data

Jun. 6, 1986 [GB] United Kingdom ................. 8613666

[51] Int. Cl.[4] ................................................ F16K 31/06

[52] U.S. Cl. ........................... 251/129.02; 251/129.16; 251/129.19

[58] Field of Search ....................... 251/129.16, 129.19, 251/129.02

[56] References Cited

U.S. PATENT DOCUMENTS 2,980,139 4/1961 Lynn .......................... 251/129.19 X

FOREIGN PATENT DOCUMENTS 2513630 3/1975 Fed. Rep. of Germany ........................ 251/129.19

*Primary Examiner*—Arnold Rosenthal
*Attorney, Agent, or Firm*—Balogh, Osann, Kramer, Dvorak, Genova & Traub

[57] ABSTRACT

An electromagnetically operable valve has a valve member which is coupled to a generally rectangular plate-like armature. The armature is attracted towards the pole faces of an "E" core when a winding on the core is energized. The movement of the armature towards the core is determined by the abutment of parts of the armature with a stop plate and the movement of the armature away from the core by the abutment of parts of the armature with a spacer positioned between the stop plate and a housing.

11 Claims, 6 Drawing Figures

ELECTROMAGNETICALLY OPERABLE VALVE

This invention relates to electromagnetically operable valves more particularly but not exclusively to valves for controlling the flow of liquid fuel at high pressure in a fuel pumping system for supplying fuel to a compression ignition engine.

Such a valve incorporates an armature which is coupled to a valve member the armature being attracted towards a stator structure. The latter carries a winding and defines pole faces presented to the armature. The extent of movement of the armature must be carefully controlled so that in the energised condition of the valve a first predetermined air gap exists between the armature and the pole faces. Moreover, the travel of the armature must be carefully controlled so that in the de-energised state of the valve a second predetermined air gap exists between the armature and the pole faces. Moreover the total movement of the armature must be greater than that of the valve member and in particular, the armature must be allowed to continue its movements towards the pole faces to establish said first air gap, after the movement of the valve member has been halted.

The object of the invention is to provide an electromagnetically operable valve in a simple and convenient form.

According to the invention an electromagnetically operable valve comprises a housing, a valve body mounted in the housing and a valve member axially slidable in the valve body between open and closed positions, an armature of plate-like generally rectangular form connected to the valve member, the armature extending generally transversely to the axis of movement of the valve member, a magnetic "E" core having an inner and a pair of outer limbs each defining a pole face respectively presented to the armature, a stop plate engaged by the outer limbs of the core, and a spacer positioned between the stop plate and the housing, retaining screws securing the core, the stop plate and the spacer to the housing, said stop plate having a central aperture through which a part of the armature can pass, a pair of opposite edges of the armature being recessed so as to form stop surfaces lying behind the face of the armature presented to the core, said stop surfaces in use, engaging with said stop plate to determine the extent of movement of the armature toward the core, the movement of the armature away from the core being limited by the abutment of portions of the armature with the spacer.

An example of a valve will now be described with reference to the accompanying drawings in which.

Figure 1:
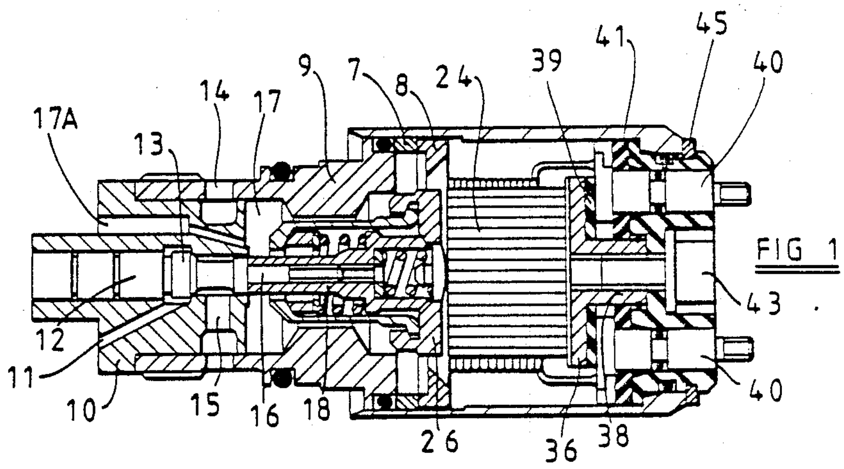
FIG. 1 is a sectional side elevation of the valve.
Figure 2:
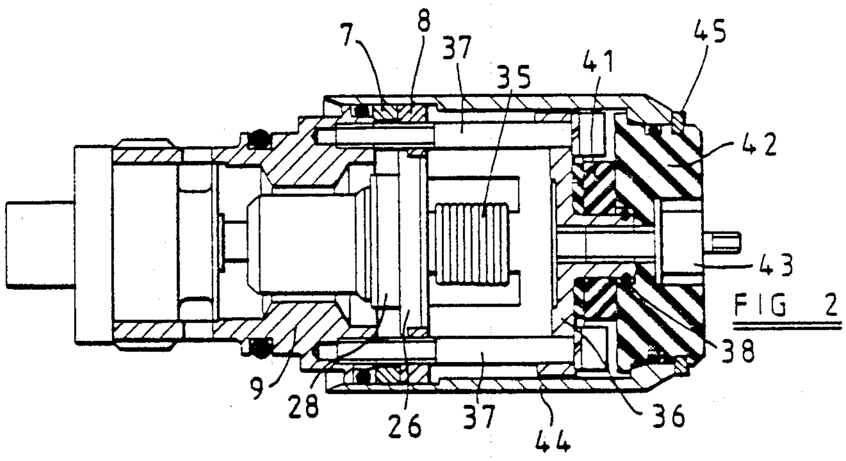
FIG. 2 is a view similar to FIG. 1 taken at right angles to FIG. 1.

With reference to FIGS. 1 and 2 the valve comprises a valve body 10 in which is defined a through bore which intermediate its ends is slightly enlarged. The enlarged portion of the bore is connected to a passage 11 in the body and which in use is connected to the pump chamber of a high pressure fuel injection pump. At one end of the enlarged portion of the bore there is formed a seating and slidable within the bore is a valve member 12 having a head 13 for engagement with the seating. The valve member has a reduced portion below the head which defines an annular chamber with the bore, the chamber communicating with at least one radial port 15 which communicates with a circumferential groove in the periphery of the body.

The body 10 is located within one end of a hollow elongated housing 9 and in which are formed ports 14 communicating with the aforesaid groove. The ports 14 in use are connected to a drain. The valve member has a screw threaded extension 16 which extends into a chamber 17 in the housing the chamber being connected to a passage 17A formed in the valve body.

Figure 3:
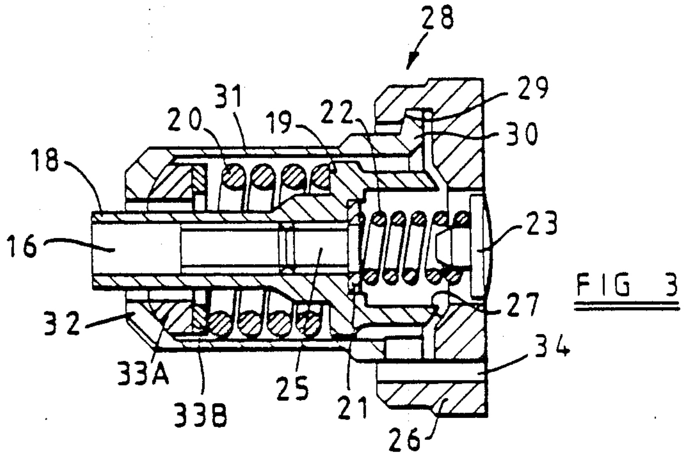
FIG. 3 is a view to an enlarged scale of part of the valve seen in FIG. 1.
Figure 4:
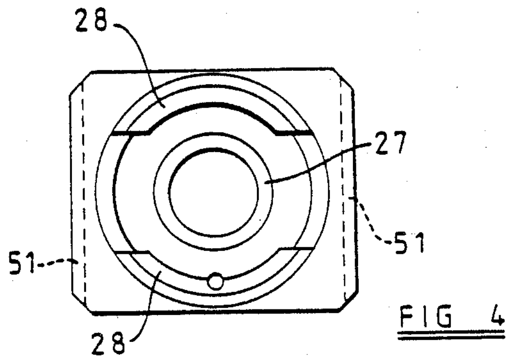
FIGS. 4, 5 and 6 are views of parts of the valve shown in the above figures.

The extension 16 is in screw thread engagement with an extension member 18 which is seen in greater detail in FIG. 3. The extension member has an exterior flange portion 19 which is engaged by an overtravel spring 20 and it defines an internal step against which is located a shim 21 which is engaged by one end of a return spring 22 the other end of which is engaged by a spring abutment 23, the latter extending through a central aperture in the armature and engaging a solenoid core 24 (FIG. 1). The extension 16 is secured within the extension member by means of a locking screw 25 and the annular end surface of the extension member remote from the valve member is of spherical form and engages with a complementary surface defined on a plate like armature 26. An end view of the armature looking in the direction away from the valve member is seen in FIG. 4 and it will be seen to be of rectangular form with a central aperture which is surrounded by the surface 27 engaged by the extension member 18.

The armature also defines a pair of arcuate claws 28 which extend in the direction of the valve member and have undercut surfaces 29. The surfaces 29 are engaged by an outwardly directed flange 30 on a hollow cylindrical spring housing 31 which also has an inwardly directed flange 32 against which is located a thrust member 33A. Located between the thrust member 33A and the spring 20 is a shim 33B. The presented surfaces of the flange 32 and the thrust member 33A are of spherical form to allow alignment movement. The flange 30 is machined over oppositely disposed regions in such manner that the two portions of the flange can pass through the gaps between the claws, the spring housing and the armature then being turned relative to each other through 90° to allow the portions of the flange 30 to engage with the undercut surfaces of the claws 28. The assembled condition of the armature/-valve member assembly is shown in FIG. 3 and when assembly has been completed a pin 34 is engaged in an aperture in the armature, the pin locating in a slot in one of the flange portions of the spring housing 31. The slot is such as to allow pivotal movement between the spring housing and the armature such movement being facilitated by the spherical nature of the co-operating surfaces of the flange portions of the spring housing and the co-operating surfaces of the flange 32 and thrust member 33A. The purpose of allowing the aforesaid pivotal movement is to allow for any misalignment in the assembly.

The armature in use has a range of movement which is slightly greater than that of the valve member and after closure of the valve head onto the seating the further movement of the armature results in compression of the spring 20 and separation of the end surface of the spring housing from the surface 27 on the armature as seen in FIG. 3.

The spring 20 stores energy during its compression, the energy being used to provide a large breakaway force when the electromagnet is de-energised and hence fast release of the armature.

The solenoid core 24 is of "E" shaped form as clearly seen in FIG. 2 and it is composed of a plurality of laminations as seen in FIG. 1. The free ends of the limbs of the core are presented to the armature 26 and the central limb is provided with an energising winding 35. The outer portions of the outer limbs of the core are engaged with an annular stop plate 8 which in turn engages an annular spacer 7 both of which will be described, the spacer engaging the housing 9. At the opposite end of the core is a clamping plate 36 which is provided with a pair of apertures which receive clamping bolts 37 which are engaged in screw threaded holes formed in the housing 9. The clamping bolts pass alongside the outer surfaces of the outer limbs of the core and the clamping force exerted thereby clamps the core, the stop plate 8 and the spacer 7 in position. The clamping plate 36 is provided on its face remote from the core with a spigot having a threaded bore. Located against the surface of the clamping plate 36 remote from the core is an insulating washer 39 which is provided with cut out portions for clearance with the heads of the bolts 37. The washer 39 is engaged by the enlarged foot portions of a pair of terminal posts 40 to which the ends of the winding are secured respectively. The terminal posts pass through a locating plate 41 again provided with cut out portions the walls of which can engage the heads of the bolts 37 to prevent angular movement of the plate about the spigot. Also provided is a terminal plate 42 through which the terminal posts extend, the terminal plate being secured to the spigot by means of a retaining bolt 43. The assembly is completed by a hollow cylindrical cover 44 which has an inwardly extending flange at one end for engagement with a step defined on the periphery of the terminal plate, the cover being retained in position by a circlip 45 which is located in a groove in the terminal plate. Resilient seal members are provided to ensure a fuel tight seal between the cover and terminal plate and between the cover and the housing 9. In addition, seal members are provided between the terminal posts and the terminal plate.

Figure 5:
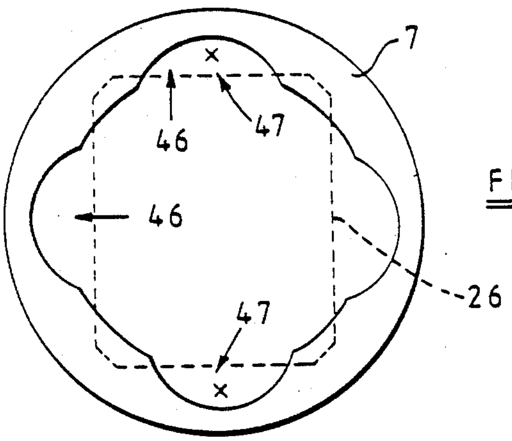
Figure 6:
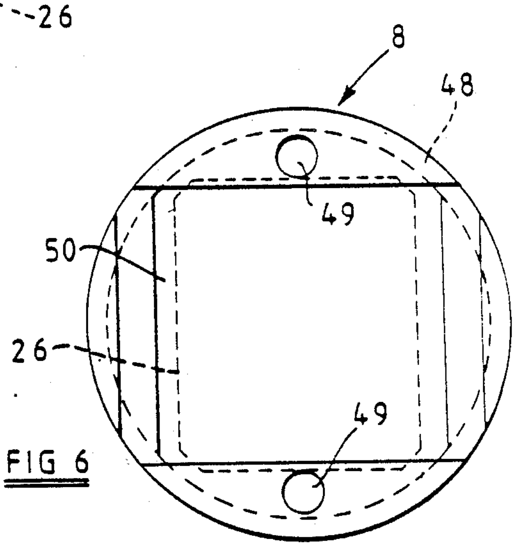

Returning now to the construction of the stop plate 8 and the spacer 7. The spacer is seen in end elevation to an enlarged scale in FIG. 5 looking in the direction of the valve member and FIG. 6 is a similar view of the stop plate 8. Each figure also shows in dotted outline the armature 26. Considering firstly the spacer 7, this comprises a flat circular disc of metal which is provided with a central opening of circular form with four arcuate recesses 46 formed in the wall of the opening. The opening thus formed is such that the rectangular armature can pass through the opening in one relative angular setting but when the armature and spacer are moved angularly relative to each other the corners of the armature interfere with the spacer. The spacer is positioned in the assembly so that the clamping bolts 37 pass within opposite recesses, the axes of the bolts being indicated at 47.

The stop plate 8 is also formed from a flat circular disc of metal but its surface presented to the spacer is machined to form an annular rim 48 which engages with the spacer. In addition, the stop plate is provided with apertures 49 through which the bolts 37 pass and a rectangular aperture 50.

The aperture 50 has its sides adjacent the apertures 49 extending normal to the plane of the disc but the other two sides incline outwardly as shown in FIG. 1. The outer limbs of the core 24 locate on the portions of the stop plate lying between the apertures 49 and the adjacent edges of the aperture 50. Moreover, as will be seen from FIG. 4 the face of the armature which is presented to the core is machined along a pair of opposite edges to provide a pair of ledges 51 which define stop surfaces for engagement with the portions of the stop plate 8 between the apertures 49 and the adjacent edges of the aperture 50, to limit the movement of the armature towards the core. The movement of the armature under the action of the return spring is limited by the engagement of the corners of the armature with the spacer 7.

The adjustment of the spring forces and the various clearances is vital to the operation of the valve. With the parts of the valve assembled to the extent shown in FIG. 3 but without the valve member, it is possible to select a shim 33B so that the force exerted by the spring 20 is correct, this spring being the so-called overtravel spring which yields to allow continued movement of the armature after the valve head has contacted the seating.

Following the adjustment above the valve member 12 is inserted in the valve body 10 and the latter in the housing 9 and then the extension 16 is secured within the extension member and locked in position using the screw 25. The gap between the armature 26 and the housing 9 is then gauged and the spacer 7 is ground to the required thickness. This sets the open position of the valve member. The spacer 7 and stop member 8 are then placed in position and the rim 48 is ground to provide the desired travel of the armature when the winding is energised, the armature travel being greater than that of the valve member. The surface of the stop member presented to the core is then ground to provide the desired clearance between the armature and the core when the armature is at the limit of its movement. The shim 21 for the return spring 22 is then selected to provide the required return spring force.

I claim:

1. An electromagnetically operable valve comprising a housing, a valve body mounted in the housing and a valve member axially slidable in the valve body between open and closed positions, an armature of plate-like generally rectangular form connected to the valve member, the armature extending generally transversely to the axis of movement of the valve member, a magnetic "E" core having an inner and a pair of outer limbs each defining a pole face respectively presented to the armature, a stop plate engaged by the outer limbs of the core, and a spacer positioned between the stop plate and the housing, retaining screws securing the core, the stop plate and the spacer to the housing, said stop plate having a central aperture through which a part of the armature can pass, a pair of opposite edges of the armature being recessed so as to form stop surfaces lying behind the face of the armature presented to the core, said stop surfaces in use, engaging with said stop plate to determine the extent of movement of the armature toward the core, the movement of the armature away from the core being limited by the abutment of portions of the armature with the spacer.

2. A valve according to claim 1 in which the face of the stop plate remote from the core defines a rim which engages said spacer, the axial width of the rim being chosen during assembly of the valve to provide the required travel of the armature.

3. A valve according to claim 2 in which said spacer has a central opening which is shaped to allow the armature to be passed through in one relative angular setting of the armature and spacer but in another relative angular setting the corners of the armature interfere with the spacer.

4. A valve according to claim 1 in which the valve member defines a valve head for co-operation with a seating defined in the valve body, the movement of the valve member between its open and closed positions being less than the movement of the armature, the connection between the armature and the valve member incorporating a spring which yields to allow continued movement of the armature towards the core after the valve head has engaged the seating.

5. A valve according to claim 4 including an extension member secured to the valve member, a flange formed on said extension member, a hollow spring housing surrounding at least part of said extension, the spring housing defining an inwardly directed flange at its end remote from the armature, a thrust member engaging said flange, said spring being located between the flange of the extension and said thrust member to urge the extension into engagement with the face of the armature remote from the core, and coupling means coupling the extension member to the armature.

6. A valve according to claim 5 in which the co-operating surfaces of the thrust member and the inwardly directed flange are of spherical form, the contacting surfaces of the extension and the armature also being of spherical form.

7. A valve according to claim 6 in which the coupling means comprises a pair of arcuate claws extending from the face of the armature remote from the core, and a pair of flange portions formed on the extension.

8. A valve according to claim 7 including a return spring acting between the extension and the centre limb of the core.

9. A valve according to claim 8 in which said return spring at one end engages a spring abutment extending through a central aperture in the armature.

10. A value according to claim 2 in which the valve member defines a valve head for co-operation with a seating defined in the valve body, the movement of the valve member between its open and closed positions being less than the movement of the armature, the connection between the armature and the valve member incorporating a spring which yields to allow continued movement of the armature towards the core after the valve head has engaged the seating.

11. A valve according to claim 3 in which the valve member defines a valve head for co-operation with a seating defined in the valve body, the movement of the valve member between its open and closed positions being less than the movement of the armature, the connection between the armature and the valve member incorporating a spring which yields to allow continued movement of the armature towards the core after the valve head has engaged the seating.

* * * * *

UNITED STATES PATENT AND TRADEMARK OFFICE
CERTIFICATE OF CORRECTION

PATENT NO. : 4,717,118

DATED : January 5, 1988

INVENTOR(S) : James C. Potter

It is certified that error appears in the above-identified patent and that said Letters Patent is hereby corrected as shown below:

On the title page:

Item [30] Foreign Application Priority Data

"Jun. 6, 1986" should read --June 5, 1986--.

Signed and Sealed this

Third Day of May, 1988

*Attest:*

DONALD J. QUIGG

*Attesting Officer*

*Commissioner of Patents and Trademarks*